Feb. 4, 1958 M. P. WINTHER 2,822,484
CONSTANT HORSEPOWER DRIVE
Filed June 23, 1954 2 Sheets-Sheet 1

INVENTOR.
MARTIN P. WINTHER
BY
McDonald & Fragno
ATTORNEYS

INVENTOR.
MARTIN P. WINTHER

United States Patent Office 2,822,484
Patented Feb. 4, 1958

---

2,822,484

CONSTANT HORSEPOWER DRIVE

Martin P. Winther, Gates Mills, Ohio, assignor to Eaton Manufacturing Company, Cleveland, Ohio, a corporation of Ohio Application June 23, 1954, Serial No. 438,692

9 Claims. (Cl. 310—96)

This invention relates to variable speed prime motor drives and more particularly to drives capable of exerting increased torque, over that provided by the motor, at lower output speeds of the drive.

Broadly the invention comprehends the provision of a drive comprising a prime mover, such as an electric motor, an automatic torque converter, and a speed controlled coupling arranged in series driving relation providing for a controlled constant horsepower output of the drive.

In the past, gear boxes of one sort or another have been used in combination with a motor or other type of prime mover and a speed controlled coupling in order to increase horsepower at lower speeds of the prime mover. Furthermore, such arrangement is not automatic and is additionally cumbersome and unsatisfactory except in a few isolated cases.

Among the principal objects of the invention is the provision of constant horsepower output drive employing a motor or the like as a prime mover that:

(a) Provides increased torque at lower speeds of output of the drive;

(b) Provides a constant horsepower output for all speeds of operation of the drive;

(c) Provides a compact arrangement of automatic torque converter, and speed controlled coupling driven in series from the motor; and, (d) Includes in addition to the prime mover, a hydraulic torque converter, and a speed controlled electromagnetic coupling, wherein upon the speed controlled setting of the output of the coupling, to a proportionate speed of the prime mover, a constant horsepower output of the drive is always maintained.

Figure 1:
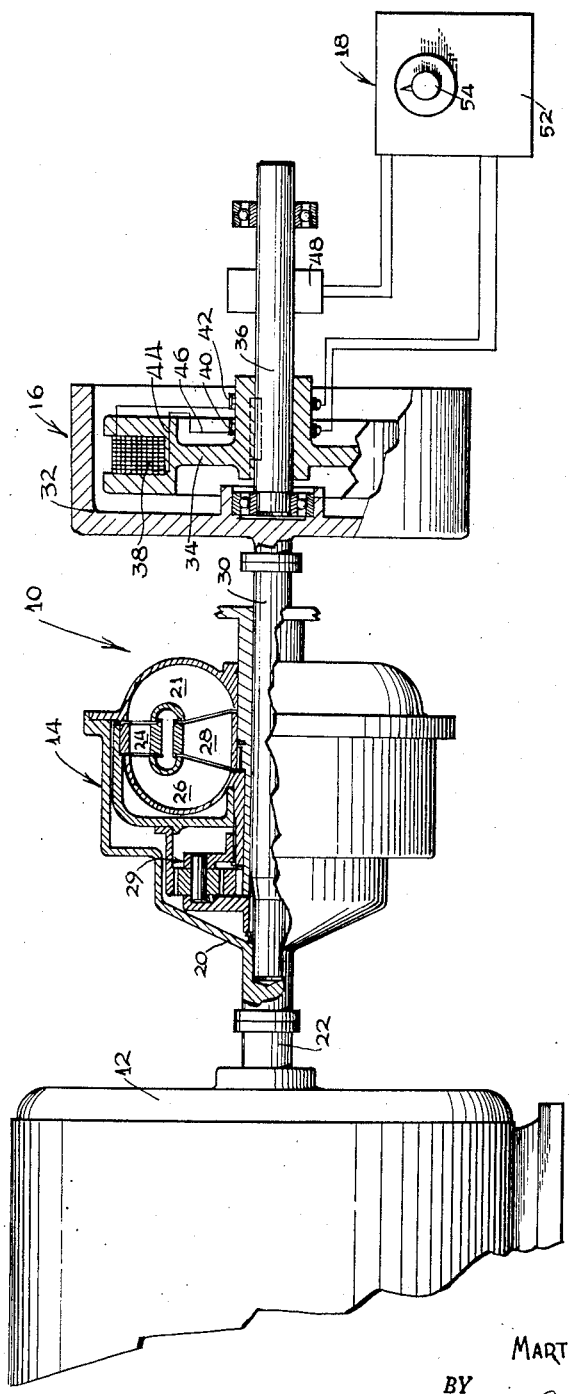
Figure 2:
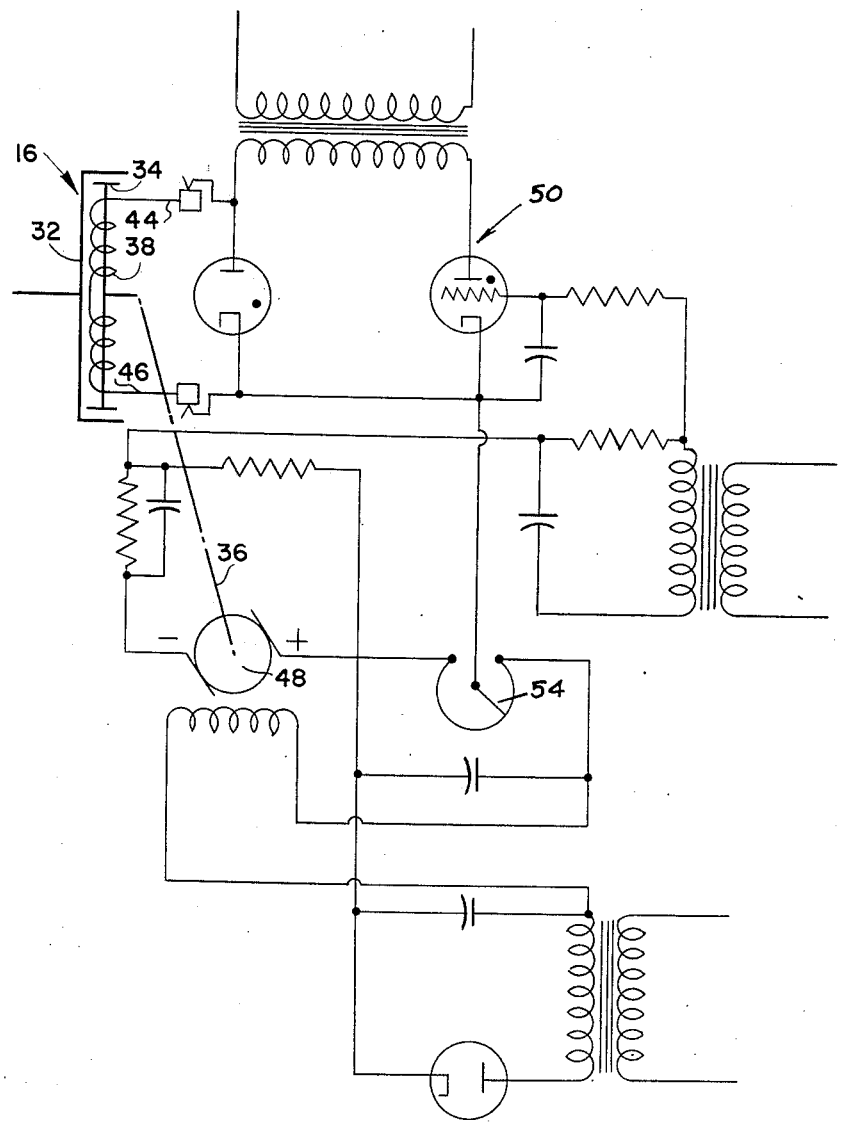

Other objects and advantages of the invention will appear from the following description taken in connection with the drawings forming a part of the specification, and in which:

Fig. 1 is a partly broken away partly cross-sectionalized side elevation view of a drive, constituting the invention; and, Fig. 2 is a schematic diagram of a speed control circuit for the coupling of Fig. 1.

Similar reference characters indicate corresponding parts throughout the several views of the drawings.

This invention is directed at the provision of a drive capable of providing for a constant horsepower output over a wide range of controlled output speeds wherein the motive means of the drive is a prime mover such as an electric motor. The electric motor is preferably of the induction motor type. A drive of this type is suitably adaptable to engine lathes, planer milling machines and the like where it is desirable to have automatic increase in torque with reduction in speed.

As a means of obtaining a desired drive to accomplish the aforesaid, it is proposed to use an electric motor of the constant speed type such as an induction motor, a hydraulic torque converter having a relatively wide torque range and high efficiency at top output speed, an eddy current coupling arranged in series driving relation and electronic speed control means for the coupling.

Referring to the drawings for more specific details of the invention 10 represents generally a constant horsepower controlled speed variable speed drive.

Drive 10, as disclosed by Fig. 1, includes an electric motor 12 of the constant speed type, as a prime mover, a hydraulic torque converter 14, an eddy current electromagnetic coupling 16 and an electronic speed control means 18, for the coupling.

Hydraulic torque converter 14 is of the type disclosed in Robert C. Russell Patent No. 2,616,309 for Transmission having a wide torque range and high efficiency at top output speed. Torque converter 14 includes an input member 20 directly coupled to an output shaft 22 of motor 12, an impeller member 21 connected to member 20, first and second turbines or runner members 24 and 26, reaction member 28, an output shaft 30 and a planetary gear assembly 29 interconnected between the turbines and output shaft.

Eddy current coupling 16 includes an input drum member 32 fixedly connected to the output shaft 30 of converter 14, a rotor or driven member 34, cooperative with drum member 32, and an output shaft 36 to which a load is adapted to be applied fixedly secured to rotor 34. An energizable magnetic coil 38 is supplied controlled current from means 18 by way of current conducting brushes 40 and 42 connected through suitable current conducting wires 44 and 46 connected to opposite ends of coil 38.

Electronic speed control means 18 includes a speed control generator 48 driven from output shaft 36 with current connection thereof with an electronic circuit 50 of means 18. As indicated by Fig. 1, circuit 50, disclosed in detail in Fig. 2 is enclosed in a cabinet 52 having a speed control setting dial 54 thereon. Circuit 50 is merely representative of one form of circuit applicable to the output speed control of coupling 16 and is of the type more fully disclosed, defined and claimed in Ralph L. Jaeschke Patent No. 2,659,832 for Speed Control System for Electromagnetic Coupling.

Assuming that the torque converter 14 is capable of a maximum torque multiplication of 3 to 1 when output shaft 36 is stalled and that a 1½ to 1 torque increase can be obtained at output shaft 36 at say an output speed thereof approximately equal to one-half the speed of motor 12 and assuming further that there are no losses in the drive through the several component mechanisms thereof, it is obvious that drive 10 will have a constant horsepower output from top speed to at least one-half speed thereof. It will thus be seen that with dial 54 set to control output shaft 36 of drive 10 to regulate by way of the electronic control means 10 at one-half the motor speed, eddy current coupling 16 can be loaded to a point where the torque is 1½ times the electric motor, because of the effective torque multiplication of converter 14. It is conceivable that due to losses of efficiency in transmission through the series driving arrangement of the various component mechanisms of drive 10 that the direct ratios above stated are approximate rather than positive. Accordingly, the electric motor horsepower will have to be based on the horsepower maximum desired at any of the lower speeds of controlled setting of the output of drive 10 plus what is necessary to make-up for the hydraulic torque converter and eddy current coupling losses.

When speed control setting dial 54 is set for ¾ of motor speed as compared to ½ of motor speed, the output shaft 36 could so be loaded so that the horsepower output would be the same as it was at ½ motor speed, such for example if the output was 25 horsepower at 900 R. P. M., for an 1800 R. P. M. motor, the output at ¾ motor speed or 1350 R. P. M. would remain at 25 horsepower, with a corresponding proportionately lower torque multiplication through converter 14. In view of the automatic adjustment of converter 14 to the requirements of the horsepower demand put out through shaft 36, no control of the converter is necessary for variations in speed control of the shaft 36.

Regardless of the speed setting of the output shaft 36, it will be apparent upon removing the load therefrom that the input member of the coupling will rise to approximately motor speed, that is assuming approximately a 1 to 1 coupling operation of the torque converter.

Although not so disclosed in connection with torque converter 14 and coupling 16, it will generally be necessary to provide suitable air or liquid cooling means for removing the heat generated in the coupling and cooling means for absorbing the heat generated in the torque converter.

Although the various component mechanisms of drive 10 are specifically disclosed and defined hereinbefore, it is conceivable that other types of prime movers could be substituted for motor 12 such as a limited speed range driven engine, that various forms of automatic torque converters could be substituted for hydraulic torque converter 14 and that instead of eddy current coupling 16 other like speed controllable couplings such as a magnetic fluid magnetic clutch could be used. Accordingly, in the light hereof, the appended claims are to be so interpreted.

What I claim is:

1. A drive comprising a constant speed prime mover, an automatic torque converter having its input connected to the output of the prime mover, and a speed controlled coupling having its input connected to the output of the converter.

2. A drive comprising a constant speed electric motor including an output member, an automatically variable torque multiplication mechanism including input and output members, and a speed controlled coupling including input and output members, said input member of the mechanism being coupled to the output member of the prime mover, and said input member of the coupling being coupled to the output member of the mechanism and wherein upon a speed controlled setting of the output of the coupling, proportional to the speed of the prime mover, a constant horsepower output of the drive is maintained.

3. A drive according to claim 2 wherein the mechanism is a hydraulic torque converter.

4. A drive according to claim 2 wherein the coupling is an electromagnetic clutch.

5. A drive comprising a prime mover including an output member, an automatically variable torque multiplication mechanism including input and output members, a speed controllable coupling including input and output members, and means driven from the output member of the coupling for controlling the speed of operation thereof, said input of the mechanism being coupled to the output of the prime mover and said input member of the coupling being coupled to the output of the mechanism, said speed controlling means being electronic and including a speed control generator driven from the output member of the coupling effective upon the speed controlled setting of the output of the coupling, to a proportionate speed of the prime mover, to maintain a constant horsepower output of the drive.

6. A drive according to claim 5 wherein the coupling is of the eddy current type.

7. A drive comprising a prime mover including an output member, a hydraulic torque converter including input and output members, an electromagnetic coupling including input and output members, and an electronic speed control means, for controlling the output speed of the coupling, including a generator driven from the output member of the coupling and an electronic circuit connected therewith, said input member of the converter being coupled to the output member of the prime mover and said input member of the coupling being coupled to the output member of the converter and wherein upon the speed controlled setting of the output of the coupling, to a proportionate speed of the prime mover, a constant horsepower output of the drive is maintained.

8. A drive according to claim 7 wherein the prime mover is an electric motor and wherein the control means includes means for setting the desired speed of operation of the output of the coupling.

9. A drive according to claim 8 wherein the electric motor is of the constant speed type.

References Cited in the file of this patent

UNITED STATES PATENTS

| | | |
|---|---|---|
| 1,104,710 | Scott | July 21, 1914 |
| 2,101,606 | Ayres | Dec. 7, 1937 |
| 2,184,606 | De Lavaud | Dec. 26, 1939 |
| 2,453,877 | Trail | Nov. 16, 1948 |
| 2,465,982 | Winther et al. | Mar. 29, 1949 |
| 2,548,207 | Dunn | Apr. 10, 1951 |
| 2,616,309 | Russell | Nov. 4, 1952 |
| 2,659,832 | Jaeschke | Nov. 17, 1953 |